3,010,973
2,5-BIS(HYDROCARBONOXY)DIOXANES

Alfred Hirsch, Irving Rosen, and Richard A. Di Sanza, Painesville, Ohio, assignors to Diamond Alkali Company, Cleveland, Ohio, a corporation of Delaware
No Drawing. Filed Aug. 1, 1956, Ser. No. 601,345
5 Claims. (Cl. 260—340.6)

This invention relates to new chemical compounds, compositions containing such compounds, and to methods for their use.

The novel compounds of this invention are derivatives of 1,4-dioxane and have the general structural formula represented below:

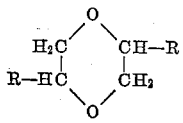

In the structural formula, R is selected from the group consisting of aryloxy, alkoxy, SCN and —OR₁Y, where R₁ is an alkylene radical, and Y is selected from the group consisting of chlorine and bromine, and amino, polysulfide, sulfonate or aryloxy groups.

Briefly, the process for preparing the novel compounds of this invention comprises the step of reacting 2,5-dihalodioxane with compounds containing the group R in the formula presented above. In general, the dihalodioxane, of which 2,5-dichlorodioxane is representative, is reacted with aryloxy, alkoxy, SCN salts and —OR₁Y compounds either directly or in an organic solvent such as methyl ethyl ketone to produce the novel compounds of this invention. It should be mentioned that the compound 2,5-dichlorodioxane is well known in the art and, consequently, details regarding its preparation need not be disclosed here.

Exemplary of the compounds derived from 1,4-dioxane where R is selected from the group consisting of aryloxy compounds are sodium derivatives of phenols, halogenated phenols, naphthols and hydroquinone. More specifically, the novel compounds derived from 1,4-dioxane where R is selected from the aryloxy group, are 2,5-bis(pentachlorophenoxy) dioxane; 2,5 - bis(2,4 - dichlorophenoxy) dioxane; 2,5-bis(alpha-naphthoxy) dioxane; and a polymer with the disodium salt of hydroquinone. Compounds where R is selected from the group consisting of alkoxy compounds are the saturated, unsaturated and substituted aliphatic alcohols. These novel compounds are represented by 2,5-bis(octyloxy) dioxane; 2,5-bis(n-decyloxy) dioxane; 2,5-bis(octadecyloxy) dioxane; 2,5-bis(2-propynyloxy) dioxane; 2,5-bis(2-propenyloxy) dioxane; 2,5-bis (2-chloroethoxy) dioxane; 2,5-bis(2-cyanoethoxy) dioxane; 2,5 - bis(1 - cyanoethoxy) dioxane; 2,5 - bis(2-phenoxyethoxy) dioxane; 2,5-bis(2-bromoethoxy) dioxane; 2,5-bis(3-chloropropoxy) dioxane; and 2,5-bis(2-butoxyethoxy) dioxane. Where R is selected from the SCN group the compound is 2,5-dithiocyanodioxane. Where R is selected from the —OR₁Y group, R₁ is an alkylene radical and the radical Y is represented by chlorine and bromine, and amine, polysulfide, sulfonate and aryloxy groups of which phenols, halogenated phenols and the like are exemplary. Typical compositions where Y is an amino are polymers of 1,2-diamino ethane, 1,3-diamino propane and 1,6-diamino hexane; where Y is a polysulfide the chemical compositions are polymers of sodium polysulfide. Where Y is a sulfonate, the chemical compound is represented by 2,5-bis(sodium oxyethanesulfonate) dioxane and where Y is an aryloxy group the chemical compounds are represented by 2,5-bis(2-phenoxyethoxy) dioxane.

In order that those skilled in the art may be able to understand the methods of preparing the novel compounds of this invention, reference is made to the following examples.

Derivatives of 1,4-dioxane where R is selected from the aryloxy group:

Example I

The compound 2,5-bis(pentachlorophenoxy) dioxane is prepared by adding 1.0 gram (0.0064 mol) of 2,5-dichlorodioxane to a solution of 3.7 grams (0.013 mol) of sodium pentachlorophenate in 20 ml. of methyl ethyl ketone. The mixture is heated to boiling for about 5 minutes during which time a precipitate is formed. The precipitate is filtered and washed with methyl ethyl ketone and water and dried at 90° C. Upon standing, a second batch of solids is filtered from the filtrate and is also washed and dried at 90° C. The first batch weighs 0.5 gram and melts with decomposition at 241–242° C. The second batch weighs 0.3 gram and melts with decomposition at 260–261° C. Analysis of the two batches gives the empirical formula $C_{16}H_6Cl_{10}O_4$. Calculated for $C_{16}H_6Cl_{10}O_4$: 31.2% C, 0.99% H; found: 31.5% C, 1.35% H. The total product is obtained in 40% yield and melts at a temperature range of 241–261° C. The wide melting point range is due to geometric isomers present in the composition.

Example II

The compound 2,5-bis(2,4-dichlorophenoxy) dioxane is prepared by adding 12.5 grams (0.08 mol) of 2,5-dichlorodioxane to a solution of 33.0 grams (0.18 mol) of sodium 2,4-dichlorophenate in 175 ml. of methyl ethyl ketone in a flask equipped with a reflux condenser and stirrer. The mixture is refluxed for 1½ hours and then cooled. The precipitate formed is filtered and washed with methyl ethyl ketone and water. The filtrate is refluxed for an additional hour and the mixture cooled. An additional batch of precipitate is obtained. The total precipitate weighs 32.0 grams. The material is recrystallized from one-half toluene and one-half benzene to obtain a yield of 14.4 grams of crystals melting at 210–211° C. Water is added to the methyl ethyl ketone filtrate to obtain a solid which melts at 148–150° C. which is a geometrical isomer of the novel compound. Analysis of the crystals gives the empirical formula $C_{16}H_{12}Cl_4O_4$. Calculated $C_{16}H_{12}Cl_4O_4$: 46.8% C, 2.95% H; found: 46.5% C, 2.88% H.

Example III

The compound 2,5-bis(alpha-naphthoxy) dioxane is prepared by reacting 1 gram (0.0064 mol) of 2,5-dichlorodioxane in 15 ml. of methyl ethyl ketone with 2.3 grams (0.014 mol) of alpha-sodium naphthanate. The mixture is heated to boiling for about 10 minutes, allowed to cool and filtered. About 0.7 gram of a tan colored product is obtained which is washed with water, filtered and dried. The product is insoluble in hot ethanol, normal hexane and ether. It is soluble in hot dioxane, chloroform and benzene. The material is recrystallized from chloroform. Analysis of the crystals gives the empirical formula $C_{24}H_{20}O_4$. Calculated for $C_{24}H_{20}O_4$: 77.4% C, 5.41% H; found: 76.3% C, 5.32% H. The product has a melting point range of 234–251° C.

Example IV

A polymer from the disodium salt of hydroquinone is prepared by first dissolving 1.2 grams (.051 mol) of sodium in about 30 mols of methanol. To this mixture there is added 30 ml. of methyl ethyl ketone, followed by 2.8 grams (0.026 mol) of hydroquinone. The material is boiled to remove the methanol. About 4 grams of 2,5-dichlorodioxane is added to the disodium hydroquionate solution, boiled for about 10 minutes, and allowed to cool. The precipitate formed is washed with hot water, filtered and dried at 90° C. The product obtained weighs 1.9 grams and decomposes at approximately 230–260° C. Analysis of the product gives the empirical formula $(C_{10}H_{10}O_4)_n$. Calculated for $(C_{10}H_{10}O_4)_n$: 61.8% C, 5.20% H; found: 60.2% C, 5.30% H. The polymer has the structural formula:

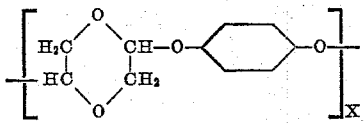

and a molecular weight of at least about 380.

Derivatives of 1,4-dioxane where R is selected from the alkoxy group:

Example V

The compound 2,5-bis(octyloxy) dioxane is prepared by adding 7.0 grams (0.045 mol) of 2,5-dichlorodioxane to a solution of 16.8 ml. (13.8 grams, 0.106 mol) of capryl alcohol in 45 ml. of methyl ethyl ketone. The mixture is heated to boiling for about 5 hours or until no more hydrochloric acid fumes are evolved. The product is distilled under vacuum and two fractions are obtained; one boiling at 174–177° C. at 14 mm. Hg and weighing 1.0 gram and the second boiling at 183–187° C. at 14 mm. Hg, weighing 0.5 gram. The two fractions are analyzed and the empirical formula $C_{20}H_{40}O_4$ is obtained. Calculated for $C_{20}H_{40}O_4$: 69.8% C, 11.7% H; found: (first fraction) 70.9% C, 11.8% H; (second fraction) 69.8% C, 11.53% H. The refractive index of the material is $n_D^{23}$ 1.4424.

Example VI

The compound 2,5-bis(n-decyloxy) dioxane is prepared by adding 2.0 grams of 2,5-dichlorodioxane (0.013 mol) to 9.0 grams (0.057 mol) of normal decanol in an open beaker and heated at from 80–110° C. until hydrogen chloride evolution ceases. Vacuum distillation of the product at 14 mm. Hg pressure yields a fraction weighing about 1.5 grams and boiling at 200–250° C. Analysis of this fraction gives the empirical formula $C_{24}H_{48}O_4$. Calculated for $C_{24}H_{48}O_4$: 72.2% C, 12.1% H; found: 72.8% C, 12.1% H. The yield is 29.3%.

Example VII

The compound 2,5-bis(octadecyloxy) dioxane is prepared by adding 2.0 grams of 2,5-dichlorodioxane (0.013 mol) to 9.0 grams of octadecanol and heating in an open beaker at from 80–110° C. for a period of about 2 hours or until hydrogen chloride evolution ceases. Upon vacuum distillation there are obtained two fractions: one boiling at a temperature range of 235–250° C. at 0.5–0.7 mm. Hg and weighing 3.0 grams and the other boiling at a temperature range of 250–270° C. at 0.7 mm. Hg weighing 2.6 grams. Analysis of the two fractions gives the empirical formula $C_{40}H_{80}O_4$. Calculated for $C_{40}H_{80}O_4$: 79.4% C, 13.3% H; found: for the fraction boiling at 235–250° C. 77.63% C, 12.91% H; for the second fraction 78.36% C, 12.97% H. The total yield obtained is 72.3%.

Example VIII

The compound 2,5-bis(2-propynyloxy) dioxane is prepared by reacting 10.0 grams of 2,5-dichlorodioxane (0.064 mol) with 8.5 grams (0.151 mol) of propargyl alcohol in a beaker. The reaction mixture is heated and stirred at a temperature of 30° until hydrogen chloride evolution from the mixture ceases. The reaction product is washed with a 4% sodium carbonate solution and then with water. The product is filtered and dried. About 9.6 grams of a white solid is obtained melting at 120–122° C. The material is recrystallized from n-hexane to yield 9.0 grams of a solid melting at 122–123° C. A sample of this is analyzed and gives the empirical formula $C_{10}H_{12}O_4$. Calculated for $C_{10}H_{12}O_4$: 61.3% C, 6.17% H; found: 61.0% C, 5.95% H.

Example IX

The compound 2,5-bis(2-propenyloxy) dioxane is prepared by reacting 10.0 grams (0.064 mol) of 2,5-dichlorodioxane with 10.0 grams (0.172 mol) of allyl alcohol in a beaker. The mixture is stirred and heated at 34° for a period of about 1½ hours or until hydrogen chloride evolution ceases. The reaction product is washed with dilute sodium carbonate and the product extracted with ether and set out to dry over magnesium sulfate. The ether extract is filtered from the magnesium sulfate and then evaporated. Vacuum distillation yields a fraction boiling at a temperature range of 140–150° C. at 40 mm. Hg pressure. Analysis of this fraction gives the empirical formula $C_{10}H_{16}O_4$. Calculated for $C_{10}H_{16}O_4$: 60.0% C, 8.04% H; found: 59.41% C, 8.0% H. The yield is 25.0%.

Example X

The compound 2,5-bis(2-chloroethoxy) dioxane is prepared by adding 5.0 grams (0.032 mol) of 2,5-dichlorodioxane to 22.0 grams (0.270 mol) of ethylene chlorohydrin and stirring the mixture until the 2,5-dichlorodioxane dissolves. The reaction mixture is then heated at from 40–50° C. for 20 minutes and allowed to cool. This is followed by adding 200 ml. of water to the mixture to obtain a white solid which is recrystallized from ethanol. The yield is 6.2 grams of product melting at 118–119° C. Analysis of the product gives the empirical formula $C_8H_{14}Cl_2O_4$. Calculated for $C_8H_{14}Cl_2O_4$: 39.20% C, 5.76% H, 28.95% Cl; found: 39.38% C, 5.79% H, 27.7% Cl.

Example XI

The compound 2,5-bis(2-cyanoethoxy) dioxane is prepared by reacting 29.5 grams of 2,5-dichlorodioxane (0.188 mol) with 39.0 grams of beta-hydroxy propionitrile (0.548 mol) in a flask equipped with an aspirator and stirrer. The reaction is kept at 25° C. and is allowed to proceed for about 5 hours or until evolution of hydrogen chloride stops. The mixture is then added to about 400 ml. of a 4% sodium carbonate solution and is permitted to stand overnight. The precipitate is filtered and dried. The material is recrystallized from benzene to obtain 17.9 grams or a 42.1% yield of product. The melting point of the material is 135–136° C. and analysis of the product gives the empirical formula $C_{10}H_{14}N_2O_4$. Calculated for $C_{10}H_{14}N_2O_4$: 53.15% C, 6.25% H, 12.37% N; found: 52.56% C, 6.11% H, 12.30% N.

Example XII

The compound 2,5-bis(1-cyanoethoxy) dioxane is prepared by reacting 5.0 grams (0.032 mol) of 2,5-dichlorodioxane with 7.1 grams (0.10 mol) of lactonitrile. The mixture is heated at 40° and is kept at that temperature for ½ hour. The reaction product is added to water to obtain a white solid precipitate which is filtered and dried. The precipitate is recrystallized from xylene to give the product melting at 159–160° C. Analysis of the product gives the empirical formula $C_{10}H_{14}N_2O_4$. Calculated for $C_{10}H_{14}N_2O_4$: 53.15% C, 6.24% H, 12.3% N; found: 53.27% C, 5.54% H, 12.3% N.

Example XIII

The compound 2,5-bis(2-phenoxyethoxy) dioxane is prepared by adding 2.4 grams (0.010 mol) of 2,5-bis(2-chloroethoxy) dioxane to 8.5 grams (0.055 mol) of sodium phenate and 30 ml. of butyl Cellosolve in a flask equipped with a reflux condenser, stirrer and thermometer. The mixture is refluxed for about 2½ hours and then permitted to stand overnight. The reaction mixture is then added to 1 liter of water containing 0.5 gram of sodium hydroxide, filtered and dried. The product is recrystallized from ethanol giving a total of 2.6 grams or a 73.6% yield. The melting point is 94–95° C. and analysis of the product gives the empirical formula $C_{20}H_{24}O_6$. Calculated for $C_{20}H_{24}O_6$: 66.65% C, 6.71% H; found: 66.12% C, 6.63% H.

*Example XIV*

The compound 2,5-bis(2-bromoethoxy) dioxane is prepared by adding 6.0 grams (.038 mol) of 2,5-dichlorodioxane to 12.5 grams (0.10 mol) of 2-bromoethanol. The reaction mixture is stirred at a temperature of about 38° C. during which time hydrogen chloride evolved for a period of about 45 minutes. The mixture is washed with water, filtered, and recrystallized from ethanol to obtain 11.7 grams or a yield of about 93% of a white solid melting at 129–130° C. Analysis of the product gives the empirical formula $C_8H_{14}O_4Br_2$. Calculated for $C_8H_{14}O_4Br_2$: 28.8% C, 4.22% H, 47.8% Br; found: 29.14% C, 4.23% H, 47.9% Br.

*Example XV*

The compound 2,5-bis(3-chloropropoxy) dioxane is prepared by adding 4.7 grams (.030 mol) of 2,5-dichlorodioxane to 7.1 grams (0.075 mol) of 3-chloropropanol-1 in a beaker. The mixture is heated at 40° C. with stirring for 1½ hours and then at 60° C. for ½ hour. The product is distilled at 30 mm. Hg pressure to yield 1.5 grams of a fraction with a boiling range of 160–200° C. and a 4.8 gram fraction boiling at 205–220° C. The two fractions are redistilled under vacuum to give a fraction boiling at 110–140° C. at 0.3 mm. Hg weighing 1.7 grams. Analysis of this fraction gives the empirical formula $C_{10}H_{18}O_4Cl_2$. Calculated for $C_{10}H_{18}O_4Cl_2$: 44.3% C, 6.71% H, 26.35% Cl; found: 44.0% C, 6.13% H, 26.0% Cl.

*Example XVI*

The compound 2,5-bis(2-butoxyethoxy) dioxane is prepared by adding 7.0 grams (0.045 mol) of 2,5-dichlorodioxane to 16.5 grams (0.14 mol) of butyl cellosolve in a flask connected to a water aspirator via a $CaCl_2$ drying tower and fitted with a stirrer. The mixture is reacted at room temperature (22–25° C.) for a period of about 15 hours and after this it is poured into about 400 ml. of water containing about 0.5 gram of sodium carbonate. The reaction product is extracted four times with ether, the ether fractions are combined, and then the ether is evaporated. The product is distilled at 3 mm. Hg pressure and five fractions are collected boiling at a temperature range of 168–219° C. The refractive index of the fractions is:

| Fraction | $n_D^{23}$ | Distillation Temp., ° C. | Weight (grams) |
|---|---|---|---|
| I | 1.4414 | 168–178 | 1.5 |
| II | 1.4430 | 178–185 | 2.9 |
| III | 1.4424 | 185–192 | 3.5 |
| IV | 1.4443 | 192–205 | 0.5 |
| V | 1.4453 | 205–219 | 0.5 |

A total yield of 8.9 grams or 62% is obtained. The wide boiling point range of the product is attributed to several geometrical isomers. The empirical formula of the product is $C_{16}H_{32}O_6$.

Derivatives of 1,4-dioxane where $R_1$ and $R_2$ are selected from the SCN group:

*Example XVII*

The compound 2,5-dithiocyanodioxane is prepared by adding 8.0 grams (0.051 mol) of 2,5-dichlorodioxane to 8.81 grams (0.109 mol) of sodium thiocyanite (NaSCN) in 200 ml. of methyl ethyl ketone. The mixture is boiled for about 5 minutes and then allowed to cool. After filtering 6.0 grams of sodium chloride from the mixture, the methyl ethyl ketone is evaporated to about ¼ its original volume and filtered. Benzene is added to the remaining solution, boiled and then cooled and filtered. The solution is then treated with decolorizing carbon and filtered and the solvent evaporated. After all the solvent is evaporated a mixture of syrup and solid is left. This is filtered and the product washed with ethyl ether. Analysis of the product gives the empirical formula $C_6H_6N_2O_2S_2$. The product decomposes at 130° C. Calculated for $C_6H_6N_2O_2S_2$: 35.7% C, 3.97% H, 13.85% N; found: 35.4% C, 3.57% H, 13.43% N.

Derivatives of 1,4-dioxane where R is selected from the group $OR_1Y$, where $R_1$ is an alkylene radical and where Y is selected from chlorine and bromine, and amino, polysulfide, sulfonate and aryloxy groups:

*Example XVIII*

A rubbery polymer from the reaction of 2,5-bis(2-chloroethoxy) dioxane and 1,2-diaminoethane is obtained by adding 10.0 grams (0.041 mol) of 2,5-bis(2-chloroethoxy) dioxane to 3.7 grams (0.061 mol) of 1,2-diaminoethane and 4 ml. of water. The mixture is added to a flask equipped with a stirrer and reflux condenser and heated to 115° C. for 10 minutes. To the reaction mixture there is then added slowly 4.0 grams (0.10 mol) of sodium hydroxide pellets and the mixture refluxed with stirring for an additional 5 minutes. The product is washed with water to remove sodium hydroxide and sodium chloride and is filtered. The product is a rubber like solid which swells in water and decomposes at 110° C. The molecular weight of this polymer is at least about 1300 and has the following structural formula:

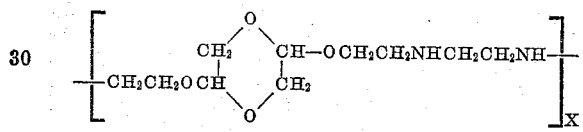

*Example XIX*

A rubbery polymer of 2,5-bis(2-chloroethoxy) dioxane and 1,3-diaminopropane is obtained in the same manner as with Example XVIII. The rubbery polymer decomposes at 110° C., swells in water, has a molecular weight of at least about 1300 and the following structural formula:

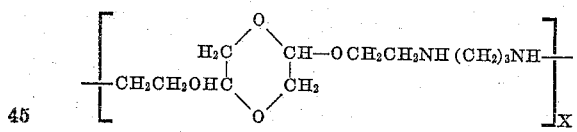

*Example XX*

Following the same procedure as with Example XVIII, except that the sodium hydroxide is omitted, a rubbery polymer is obtained from the reaction of 2,5-bis-(2-chloroethoxy) dioxane and 1,6-diaminohexane. The polymer decomposes at 110° C., swells in water, has a molecular weight of at least about 1400 and the following structural formula:

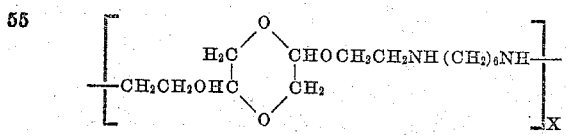

*Example XXI*

A polymer from the reaction of sodium polysulfide and 2,5-bis(2-chloroethoxy) dioxane is obtained by adding 60.0 grams of $Na_2S \cdot 9H_2O$ to 10 grams of sodium hydroxide in 240 ml. of water and heating the mixture to boiling in a beaker. Thirty grams of powdered sulfur are added to the mixture with stirring and then boiled for an additional 10 minutes. The product, corresponding to 0.38 mol of $Na_2S_{3.1}$, is filtered into a flask containing a small amount of water and 0.5 gram of an anionic wetting agent. To the mixture, at 90° C., there is added 20.0 grams (0.082 mol) of 2,5-bis(2-chloroethoxy) dioxane with stirring. The stirring is continued until the temperature falls to 85° C. and about 10 ml. of concentrated $NH_4OH$ is added. The mixture is then cooled to 55° C.

and the flask is stopped and set aside for 2 hours. After this, the mother liquor is decanted and 350 ml. of water containing 10 ml. of concentrated NH₄OH is added with stirring. The mixture is then acidified with 30% acetic acid and the polymer is removed and washed twice with water. A tough, rubber-like material is obtained weighing 15.5 grams. The polymer which has a molecular weight of at least 2100 is rubbery and has the following structural formula:

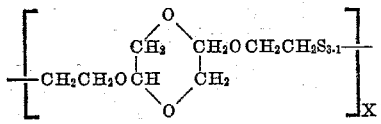

The polymers obtained by this reaction may be brittle to rubbery, depending upon the value of $S_n$; the lower the value of $n$, the more brittle the polymer.

*Example XXII*

The compound 2,5-bis(sodium oxyethanesulfonate) dioxane is obtained by reacting 10 grams (0.40 mol) of 2,5-bis(2-chloroethoxy) dioxane with a solution of 12.0 grams (0.095 mol) of sodium sulfite in 40 ml. of water. The mixture is placed in a flask equipped with a stirrer and reflux condenser. A small amount of an anionic wetting agent is added and the mixture refluxed for from about 2 to 6 hours. The product is then cooled, and filtered and the filtrate evaporated to about half its volume and filtered again. The precipitate is washed with methanol and yields 4.0 grams of a white solid which decomposes at 250–255° C. Analysis of the product gives the empirical formula $C_8H_{14}O_{10}S_2Na_2$. Calculated for $C_8H_{14}O_{10}S_2Na_2$: 23.22% C, 3.70% H, 0.0% Cl, 16.9% S; found: 23.2% C, 3.67% H, 0.20% Cl, 17.0% S.

*Example XXIII*

The compound 2,5 - bis(2 - (2′,4′ - dichlorophenoxy)-ethoxy) dioxane is prepared by adding 2.4 grams (0.01 mol) of 2,5-bis(2-chloroethoxy) dioxane to 3.9 grams (0.021 mol) of sodium 2,4-dichlorophenate and 30 mols of butyl Cellosolve. The mixture is placed in a flask equipped with a stirrer and reflux condenser and the reaction is carried out with stirring for about 45 minutes. The product is then added to 1 liter of water containing 0.5 gram of sodium hydroxide, washed, filtered and set out to dry. The product is next washed with benzene and filtered. About 1.7 grams of a tan-grey product melting at 159–163° C. is obtained. This material is recrystallized from benzene to yield 1.2 grams of white crystals melting at 164–166° C. The yield is about 24.1% and the empirical formula is $C_{20}H_{20}O_6Cl_4$. Calculated for $C_{20}H_{20}O_6Cl_4$: 48.3% C, 4.06% H, 28.5% Cl; found: 48.9% C, 4.28% H, 28.0% Cl.

The novel compounds of this invention can be prepared generally by the procedures described in the examples given above. The compounds find many uses of which the field of biological activity is an example. Thus, in the fungicidal field, the compounds show activity as will be shown below.

In the fungicidal evaluation test the compound is suspended or dissolved in distilled water at a concentration of 1000 parts per million for the spore germination test on slides, and 2000 parts per million and less for evaluation of its ability to protect tomato plants against infection by the early blight fungus *Alternaria solani*. In these tests, the compound is first dissolved in 5% acetone solution containing an emulsifier, i.e., Triton X–155 (alkyl aryl polyether alcohol) at about 0.01% concentration. In the spore germination test on glass slides the compound at 1000 parts per million is tested for its ability to inhibit germination of spores from 7 to 10 day old cultures of *Alternaria oleracea* and *Sclerotinia fructicola*. In the tomato foliage test, the plants (var. Bonny Best) are sprayed with 100 ml. of the test formulation at 2000, 400 and 80 parts per million at 40 lbs. air pressure. To illustrate generally the effect of the novel compounds of this invention in the field of biological activity the following examples are offered:

*Example XXIV*

The compound 2,5-bis(2,4-dichlorophenoxy) dioxane is tested for fungal activity in a slide germination test to spores of *Alternaria oleracea* and *Sclerotinia fructicola*. On the basis of such tests the compound inhibited at least half of the fungus spores in an amount of 1000 parts per million.

The compound is sprayed as an acetone emulsion containing Triton X–155 on 4 week old tomato plants (var. Bonny Best) afflicted with early blight (*Alternaria solani*). Using a concentration of 2000 parts per million, the inhibition of the blight by the fungicide is 28% thus indicating fungicidal activity.

*Example XXV*

The compound 2,5-bis(2-propynyloxy) dioxane is tested for fungicidal activity in a slide germination test to spores of *Alternaria oleracea* and *Sclerotinia fructicola*. On the basis of such tests the compound inhibited at least half of the fungus spores in an amount of 1000 parts per million thus indicating fungicidal activity.

*Example XXVI*

The compound 2,5-bis(2-chloroethoxy) dioxane derived from the substituted alcohols is tested for fungicidal activity in a slide germination test to spores of *Alternaria oleracea* and *Sclerotinia fructicola*. On the basis of such tests the compound inhibited at least half of the fungus spores in an amount of 1000 parts per million thus indicating fungicidal activity.

The compound is sprayed as an acetone emulsion containing Triton X–155 on 4 week old tomato plants afflicted with early blight (*Alternaria solani*). Using concentrations of 2000, 400 and 80 parts per million the inhibition of the blight by the fungicide is 48%, 33% and 31% respectively.

*Example XXVII*

The compound 2,5-bis(2′,4′-dichlorophenoxy)ethoxy dioxane is tested for fungicidal activity in a slide germination test to spores of *Alternaria oleracea* and *Sclerotinia fructicola*. On the basis of such tests the compound shows fungicidal activity by inhibiting at least half of the fungus spores in an amount of 1000 parts per million.

The effectiveness of the compound as a fungicide is also determined by spraying it as an emulsion containing Triton X–155 on 4 week old tomato plants (var. Bonny Best) afflicted with early blight (*Alternaria solani*). Using concentrations of 400, 80 and 16 parts per million the inhibition of the blight by the compound is 59%, 67%, and 34%, respectively.

In addition to the above compounds tested for fungicidal activity, others such as 2,5-bis(2-propenyloxy) dioxane, 2,5-bis(2-cyanoethoxy) dioxane, 2,5-bis(1-cyanoethoxy) dioxane, and the like, also exhibit fungicidal activity. The novel compounds of this invention can also be employed in a variety of compositions for fungicidal activity and other applications depending, of course, on the nature of the application desired. Thus, they may be used in any conventional manner, for example, foliage treatment compositions, or can be applied to the soil by spraying, drenching, and the like. The compounds can be formulated with other liquids and diluents, i.e., hydrocarbon oils, water and other solvents known in the art. The compounds of this invention, in certain instances, can be combined with other plant-treating materials such as insecticides, miticides, defoliants, etc.

In addition to the above mentioned uses, the aryloxy and alkoxy derivatives of 2,5-dichlorodioxane can also be used as high melting point plasticizers. The unsaturated alkoxy compounds are useful as monomers for polymerization reactions (addition type) to obtain high polymers for application in the film and fiber field. They are also useful as intermediates around the functional group, i.e., for materials that add to unsaturated linkages for example halogenation, sulfonation and hydrogenation reactions. The substituted alkoxy derivatives are useful for condensation type polymerization reactions and as chemical intermediates around the functional group, for example, the —CN group in 2,5-bis(cyanoethoxy) dioxane can be hydrolyzed to the carboxyl group. The 2,5-dithiocyanodioxane itself exhibits biological activity through the —SCN group. The polymers derived from the reaction of 2,5-bis(2-chloroethoxy) dioxane are useful as rubber fillers. These polymers exhibit special properties, i.e., solvent resistance, which property is desirable in rubber fillers.

The novel 2,5-dichlorodioxane derivatives of this invention are of interest also because one would normally expect decomposition of the 2,5-dichlorodioxane when reacted with compounds containing an active hydrogen as in alcohols, or with bases. This behavior is expected because of the highly labile character of the chlorine atoms in the 2,5 position of the molecule. As has been shown, however, the unexpected reaction of the 2,5-dichlorodioxane has resulted in the novel compounds of this invention.

Having thus described this invention with reference to new compositions of matter and the manner in which they may be prepared and used it is intended to cover all modifications that fall within the spirit of the invention and scope of the appended claims.

What is claimed is:
1. 2,5-bis(2-propynyloxy) dioxane.
2. 2,5-bis(2-propenyloxy) dioxane.
3. 2,5-bis(1-cyanoethoxy) dioxane.
4. 2,5-bis(2-cyanoethoxy) dioxane.
5. 2,5-bis(2-butoxyethoxy) dioxane.

References Cited in the file of this patent
UNITED STATES PATENTS

| | | |
|---|---|---|
| 2,062,404 | Dreyfus | Dec. 1, 1936 |
| 2,164,355 | Slagh | July 4, 1939 |
| 2,164,356 | Slagh | July 4, 1939 |
| 2,195,386 | Britton et al. | Mar. 26, 1940 |
| 2,385,661 | Vaala | Sept. 25, 1945 |
| 2,397,602 | Gresham | Apr. 2, 1946 |
| 2,418,297 | French et al. | Apr. 1, 1947 |
| 2,725,329 | Haubein | Nov. 29, 1955 |

OTHER REFERENCES

Frear et al.: "J. of Economic Entomology," vol. 40, pages 736–741 (1947).

Parham et al.: JACS, vol. 77, pages 6391–3 (1955).